J. C. ZEHFUS.
DUST COLLECTOR.
APPLICATION FILED AUG. 15, 1910.
997,171. Patented July 4, 1911.
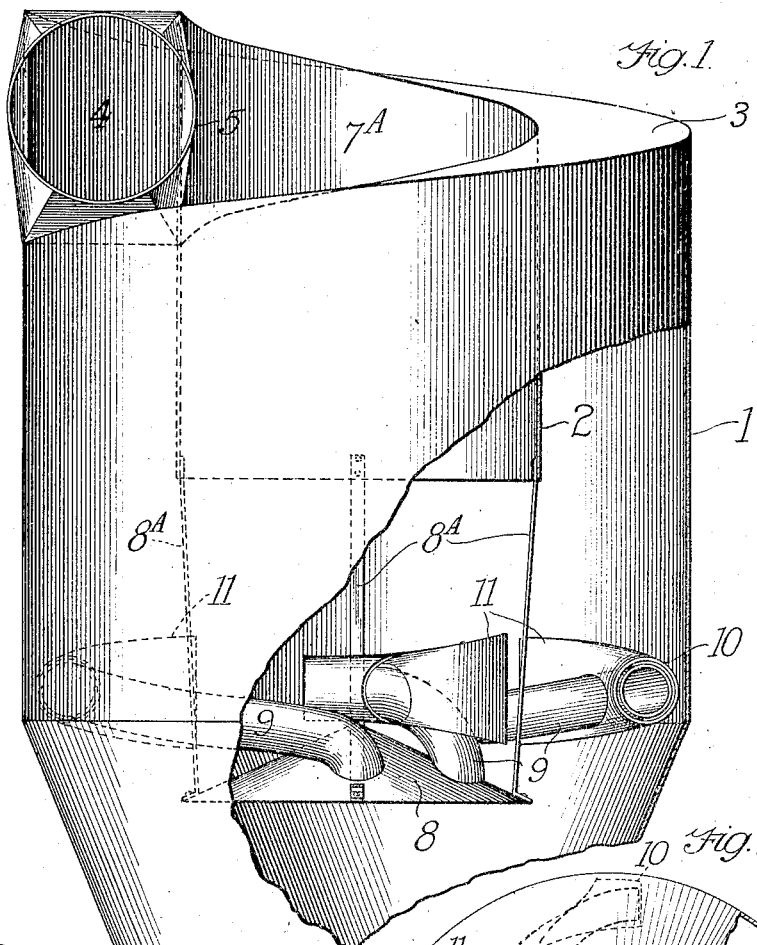
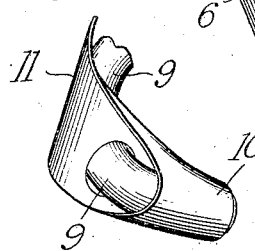
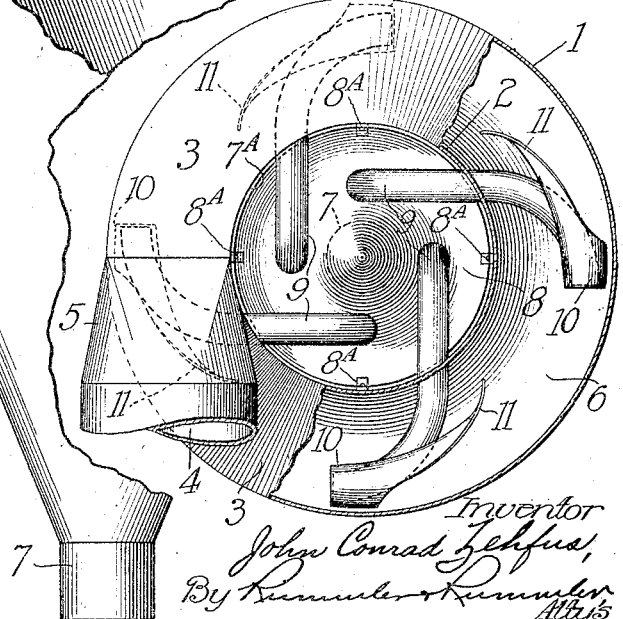
Witnesses
Martin H. Olsen
Edwin Phelps
Inventor
John Conrad Zehfus,
By Rummler & Rummler
Attys

UNITED STATES PATENT OFFICE.

JOHN CONRAD ZEHFUS, OF CHICAGO, ILLINOIS.

DUST-COLLECTOR.

997,171.  Specification of Letters Patent.  Patented July 4, 1911.

Application filed August 15, 1910. Serial No. 577,208.

*To all whom it may concern:*

Be it known that I, JOHN CONRAD ZEHFUS, a citizen of the United States of America, and a resident of Chicago, county of Cook, State of Illinois, have invented certain new and useful Improvements in Dust-Collectors, of which the following is a specification.

This invention relates particularly to dust separators of the "cyclone" type, in which the dust laden air is caused to travel a circular course, so that the comparatively heavy dust particles are separated from the conveying air current by centrifugal force, and are then downwardly delivered to a discharge hopper or funnel, while the cleaned air passes upwardly through a central air outlet.

In devices of this class, as usually constructed, the air is directed tangentially into the annular space between a pair of concentric casings, and is thus given a whirling motion about a vertical axis. An important obstacle to the separation of dust from the conveying air current in such apparatus is the fact that the whirling mass of solid particles attains a greatly increased velocity of rotation, as it approaches the contracted outlet of the delivery funnel, and this causes a whirling cloud of the finer dust particles to form in the funnel and rise until it is carried out of the air outlet.

With a view to overcoming this difficulty, the main objects of the present invention are to provide an improved form of dust collector adapted to efficiently remove the solid particles from a blast of dust laden air; to provide improved means for avoiding conflicting air-currents tending to reduce the efficiency of the dust separation and producing back pressure on the blower; and to provide improved means for returning to the dust outlet the dust which tends to pass out of the air outlet.

A specific embodiment of this invention is illustrated in the accompanying drawings, in which:—

Figure 1 is an elevation of a dust separator of the "cyclone" type constructed according to this invention, part of the exterior casing being broken away to show the parts within. Fig. 2 is a top plan of the same, partly sectional. Fig. 3 is a detail in perspective, showing the shape of the ejector nozzles.

In the construction shown in the drawings, the dust collector comprises the usual concentrically arranged cylindrical casings 1 and 2, but differing from usual constructions in having their upper ends cut to spiral form so that the plate 3 which forms the closure at the top, instead of being the usual flat annular plate, is of helical form, having its upper end located above the air inlet 4 and its lower end below said inlet. The function of the helical form of plate 3 is to cause the air current within the casing to follow a true helical course, and thereby avoid any conflict whatever of the entering air with air that has previously entered the apparatus, either immediately adjacent to the inlet 4, or at other points below said inlet. The inlet 4 communicates with the air blast pipe 5, which may be connected in the usual manner with a blower, not shown in the drawings. The outer casing 1 is contracted at its lower end to form a conical hopper or funnel 6 for directing the collected dust into the dust outlet pipe 7. The inner casing 2 is open both at the top and the bottom, and thus provides an outlet passage 7$^A$ through which the air escapes after having been separated from its burden of dust.

In order to prevent the lighter particles of dust, which tend to rise in the form of a whirling cloud in the middle of the lower part of the funnel 6 from passing out of the air outlet 7$^A$, means are provided for collecting this dust cloud and discharging it back into the main current. In the form shown, this result is accomplished by a collector bell 8, preferably carried by suitable supports 8$^A$ connected to the lower end of the inner casing 2, and a plurality of ejector pipes 9 having their inner ends communicating through the bell 8 with the space below it, and having their outer ends extending toward the side walls, into the main dust current and curved so as to extend in the direction of said main current. The outer ends of the pipes 9 are surrounded by ejector nozzles 10 so formed as to cause a concentrated current to flow past the outer ends of the pipes 9 so as to exhaust the contents of said pipes, in the manner well known in ejectors and similar pumping devices. The nozzles 10 are larger at their inlet ends than at their outlet ends, and are so formed as to collect and intensify the velocity of the air and dust particles so as to increase the ejector action, and thereby insure that any dust accumulating under the collector bell 8 will be sucked away and delivered again into the main current.

The operation of the device shown is as follows:—The blast of dust laden air enters the separator through the inlet 4 and is caused by concentric cylindrical casings 1 and 2, and the spiral top plate 3, to follow a true spiral course, whereby it will continue to pass around and around the interior of the casing without obstruction and without conflicting with itself at any point. This rotary movement of the air causes the dust particles to fly centrifugally outward, while the lighter air is crowded inward and escapes upward through the air outlet pipe 7ᴬ. The dust laden air current continues its spiral course around the converging walls of the hopper 6. Here the velocity of advance of the dust laden air continues practically undiminished, but as the diameter becomes less, the speed of rotation of the air will accordingly increase. This high speed of rotation gives rise to conditions which cause some of the lighter particles of dust to rise in the form of a whirling cloud similar to a whirlwind, as hereinbefore mentioned. The ejector effect of the nozzles 10 gives rise to a partial vacuum in the pipes 9 and below the collector bell 8, and the rising cloud of lighter particles accordingly flows through the pipes 9, and is again caused to mingle with the heavier particles adjacent to the walls of the funnel. The combined result of this construction is an increase in the capacity of the apparatus and in the efficiency of the air separation.

Although but one specific embodiment of this invention is herein shown and described, it will be understood that numerous details of the construction shown may be altered or omitted without departing from the spirit of this invention, as defined by the following claims.

I claim:—

1. A dust collector of the cyclone type, comprising a casing having a dust outlet at the bottom and having side walls converging toward said outlet, said casing also having an air inlet directed into the upper part of said casing, and an air outlet above said dust outlet, a collector bell located in said casing between said air and dust outlets, and means providing a direct passage for dust from said collector bell transversely outward toward the walls of said casing.

2. A dust collector of the cyclone type, comprising a casing having a dust outlet at the bottom and having side walls converging toward said outlet, said casing also having an air inlet directed into the upper part of said casing, and an air outlet above said dust outlet, a collector bell located in said casing between said air and dust outlets, and a pipe extending from said bell transversely outward toward the side of said casing and turned in the direction of the air current, whereby dust particles rising below said bell will be discharged outwardly by said pipe and returned to the main current.

3. A dust collector of the cyclone type, comprising a casing having a dust outlet at the bottom and having side walls converging toward said outlet, said casing also having an air inlet directed into the upper part of said casing, and an air outlet above said dust outlet, a collector bell located in said casing between said air and dust outlets, a pipe extending from said bell outward toward the side of said casing and turned in the direction of the air current, whereby dust particles rising below said bell will be discharged outwardly by said pipe and returned to the main current, and an ejector nozzle surrounding the delivery end of said pipe and adapted to concentrate the current passing the end of said pipe to intensify the flow through said pipe.

4. A dust collector of the cyclone type, comprising a casing having a dust outlet at the bottom and having side walls converging toward said outlet, said casing also having an air inlet directed into the upper part of said casing, and an air outlet above said dust outlet, a collector bell located in said casing between said air and dust outlets, a plurality of radiating pipes extending from said bell outward toward the side of said casing and turned in the direction of the air current, whereby dust particles rising below said bell will be discharged outwardly by each of said pipes and returned to the main current, and an ejector nozzle surrounding the delivery end of each of said pipes and adapted to concentrate the current passing the end of each of said pipes to intensify the flow through said pipes.

5. A dust collector of the cyclone type, comprising a casing having a dust outlet at the bottom and having side walls converging toward said outlet, said casing also having an air inlet directed into the upper part of said casing, and an air outlet located above said dust outlet and in substantial alinement therewith, a collector bell located in said casing between said air and dust outlets, and means providing a direct passage for dust from said collector bell transversely outward toward the walls of said casing.

Signed at Chicago this 11th day of August, 1910.

JOHN CONRAD ZEHFUS.

Witnesses:
 EUGENE A. RUMMLER,
 MARY M. DILLMAN.